United States Patent [19]

Cohen

[11] Patent Number: 5,111,823
[45] Date of Patent: May 12, 1992

[54] APPARATUS AND METHOD FOR GENERATING ECHOGRAPHIC IMAGES

[75] Inventor: Nathan Cohen, Boston, Mass.

[73] Assignee: National Fertility Institute, San Francisco, Calif.

[21] Appl. No.: 508,131

[22] Filed: Apr. 16, 1990

Related U.S. Application Data

[63] Continuation-in-part of Ser. No. 341,047, Apr. 20, 1989, abandoned.

[51] Int. Cl.$^5$ ................................................ A61B 8/00
[52] U.S. Cl. .................................. 128/660.07; 73/602

[56] References Cited

U.S. PATENT DOCUMENTS

| | | | |
|---|---|---|---|
| 4,397,006 | 8/1983 | Galbraith, Jr. | 367/40 |
| 4,442,715 | 4/1984 | Brisken et al. | 73/626 |
| 4,470,305 | 9/1984 | O'Donnell | 73/626 |
| 4,478,085 | 10/1984 | Sasaki | 73/625 |
| 4,509,525 | 4/1985 | Seo | 128/661.09 |
| 4,553,437 | 11/1985 | Luthra et al. | 73/602 |
| 4,586,135 | 4/1986 | Matsumoto | 364/414 |
| 4,604,697 | 8/1986 | Luthra et al. | 364/413 |
| 4,664,122 | 5/1987 | Yano | 128/660.87 |
| 4,677,981 | 7/1987 | Coursant | 128/660.1 |
| 4,817,614 | 4/1989 | Hassler et al. | 128/660.05 |
| 4,835,689 | 5/1989 | O'Donnell | 364/413.25 |

OTHER PUBLICATIONS

O'Donnell et al. "Phase Aberration Measurements in Medical Ultrasound: Human Studies", *Ultrasonic Imaging*, vol. 10, pp. 1-11 (1988).

O'Donnell et al. "Phase-Aberration Correction Using Signals from Point Reflectors and Diffuse Scatterers: Measurement", IEEE Transactions on Ultrasonics, Ferroelectrics and Frequency Control, vol. 35, No. 6, pp. 768-774 (1988).

Hayakawa "Multifrequency Echoscopy for Quantitative Acoustical Characterization of Living Tissues", *J. Acoustical Society of America*, vol. 69 (6), pp. 1838-1840 (1981).

"Real-Time Improvement of both Lateral and Range Resolution by Optical Signal Processing", *Ultrasonics Symposium Proceedings*, pp. 1002-1005 (1977).

Cohen, "Phase Recovery and Calibration with Underwatr Acoustic Arrays", *J. Acoustical Society of America*, Sup. 1, vol. 82, pp. 574-575 (1987).

Hogborn "CLEAN as a Pattern Recognition Procedure", *Indirect Imaging*, Cambridge University Press, pp. 247-254 (1983).

"Aperture Synthesis with a Non-Regular Distribution of Interferometer Baselines", *Astronomy Astrophysics, Suppl.* 15 pp. 417-426 (1974).

Thompson, et al., "Interferometry and Synthesis in Radio Astronomy", 1986 John Wiley & Sons, p. 14.

O'Dunnell et al. "Aberration Correction Without the need for a Beacon Signal", IEEE Ultrasonics Symposium, pp. 833-837 (1988).

*Primary Examiner*—Francis Jaworski
*Attorney, Agent, or Firm*—Flehr, Hohbach, Test, Albritton & Herbert

[57] ABSTRACT

An apparatus and method to generate low power ultrasonic, echograph images of selected stationary and moving target objects having high resolution. The apparatus and method include: an apparatus for transmitting a plurality of ultrasonic signals into a selected area of tissue, and apparatus for receiving the corresponding ultrasonic echo signals for each of the transmitted signals. A correlator autocorrelates and cross-correlates the transmitted and received ultrasonic signals. The correlated signals are summed, combined in ratios and partitioned into visibility amplitude data, visibility phase data, differential phase data, closure amplitude data and closure phase data for mapping. The preferred apparatus and method thereafter perform a non-linear image processing, either by an iterative side lobe subtraction signal processing procedure to remove signal noise and/or by an interative hybrid mapping signal processing procedure. The resulting data map yields a high resolution image of the selected target with more data and less noise. Signal processing to show motion or target object changes after noise reduction is also disclosed. In a preferred embodiment, the apparatus and method is employed as a clinical diagnostic tool for generating non-traumatic, high resolution imaging of bodily tissue.

46 Claims, 7 Drawing Sheets

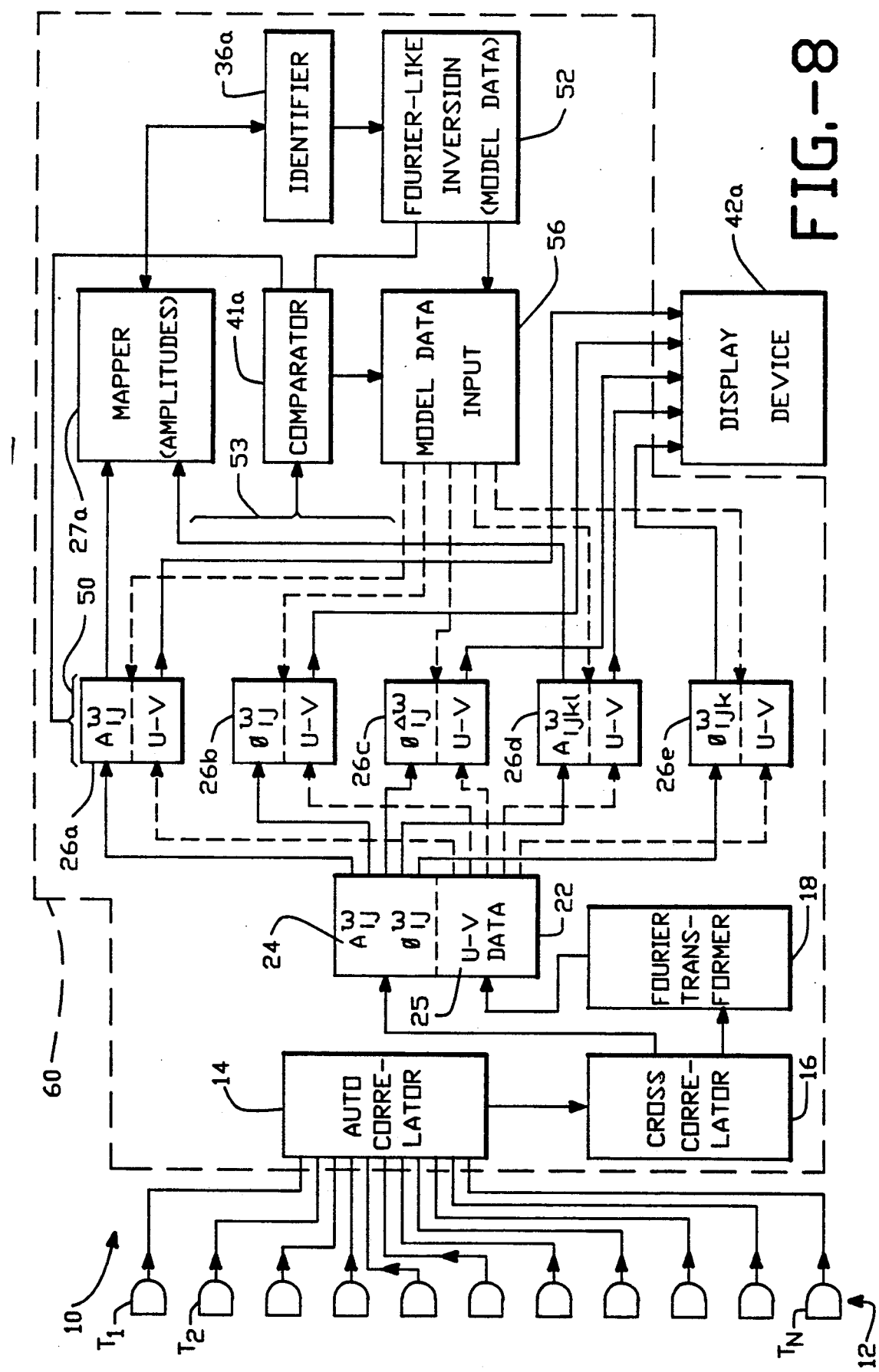

APPARATUS AND METHOD FOR GENERATING ECHOGRAPHIC IMAGES

RELATED APPLICATION

This application is a continuation-in-part application based upon parent application Ser. No. 07/341,047 filed Apr. 20, 1989, entitled APPARATUS AND METHOD FOR GENERATING ECHOGRAPHIC IMAGES, and now abandoned.

TECHNICAL FIELD

The present invention relates, generally, to an ultrasonic imaging apparatus and method. More particularly, the present invention relates to echography apparatus and methods which generate images of stationary and moving target objects, such as are typically scanned in biomedical applications.

BACKGROUND OF THE INVENTION

Ultrasonic imaging machines are popular for a variety of diagnostic and therapeutic medical and clinical procedures, e.g., cardiovascular diseases, gynecologic and obstetric applications, tumor studies and pulmonary diseases. One of the most widespread uses of ultrasonic imaging equipment has been in connection with early pregnancy diagnosis and the evolution of fetal development and well being. Medical personnel rely on the generated images to observe and study the growth, development and movement of the early conceptus and subsequently the fetus. Such ultrasonic monitoring also will enable the detection of abnormalities. The College of Obstetrics and Gynecology now recommends that women undergo routine prenatal ultrasonic evaluations, and routine ultrasonic imaging has, therefore, become the norm for proper prenatal care.

Ultrasonic imaging machines, however, have their limitations and may not be completely risk-free. Current ultrasonic devices require the direct transmission of high frequency, high power, sonic signals, typically in the range of 3 to 7 megahertz. In the obstetrics setting ultrasound is directed into the mother's womb transabdominally or, via a probe inserted into the vagina, transvaginally to generate an image with sufficient resolution and clarity to allow proper evaluation. Laboratory studies on tissue exposed to ultrasound, however, suggest that prolonged exposure to such high energy waves may damage fetal or maternal tissue.

A typical prior art ultrasonic echographic imaging assembly is shown in FIG. 1. A probe 100 carries a plurality of transducers 101 in a known geometric array. Wave/pulse generator 102 drives transducers 101 to simultaneously transmit an ultrasonic signal toward the target to be imaged (not shown). Echo signals from the target are received by transducers 101 and communicated to a signal processing apparatus, such as computer 103, through analog-to-digital converter 104. The transmitted signal also is communicated to the signal processing apparatus, either directly from wave/pulse generator 102 through converter 104 or, more typically, from transducers 101.

Processing of the transmitted ultrasonic signals and received echo signals typically involves autocorrelation of the transmitted and received signal for each transducer, as indicated by autocorrelator box 106, and may include cross-correlation of the data for each auto correlation with the data for each other autocorrelation, as indicated by cross-correlator box 107. The autocorrelated and cross-correlated data is then both stored in a data matrix 108. A three-dimensional image is available through the use of such an array. The time of arrival of the echo signals will contain two components, namely, range and azimuthal position.

The data yielded from the auto- and cross-correlation is referred to, for example, in radio astronomy, as the complex visibility function comprised of "visibility amplitude" data, $A_{ij}{}^{\tau}$, and "visibility phase" data, $\phi_{ij}{}^{\tau}$. See, e.g., Thompson, et al., "Interferometry and Synthesis in Radio Astronomy", 1986 John Wiley & Sons, p. 14. While these data are in time domain, the convention is to describe them with equivalent variables in the frequency domain. The frequency domain is described herein by the usual convention, the Fourier transform of the time domain is the Fourier transform of the frequency domain. As is well known in the ultrasonic imaging field, the visibility amplitude data is much more reliable than the visibility phase data, which is severely corrupted by noise, such as complex side lobes, systematic phase noise, and calibration problems. Calibration problems, particularly those due to phase differences from the propagation of ultrasonic wave within an inhomogeneous medium lead to so called "phase aberration," often considered to be the greatest obstacle to good echographic imaging.

Two broad approaches have been taken to the phase aberration problem. One is to disregard or not use the phase data because it can contribute so much noise that its use does not enhance the signal-to-noise ratio or the resultant resolution and dynamic range of the images produced. The other broad approach is to provide a system which attempts to correct for phase aberration, for example, by the use of filters, time delays or other approximations.

When phase data is disregarded, imaging essentially is effected in prior art ultrasonic apparatus by mapping the visibility amplitude data, as indicated by mapper box 111. Mapper 111 combines the data with position information as to transducer location to synthesize an aperture corresponding to the probe transducer array. Once the image is mapped, the image of the target can be displayed on output device 112, which is advantageously a video display terminal.

Unfortunately, the visibility amplitude data still contains considerable noise. Equipment calibration and side lobe effects contribute significant noise, and the image which results has a resolution and dynamic range well below that which would be optimal.

When phase data is used in ultrasonic imaging, one of the most common approaches to the reduction phase aberrations is the use of adaptive reduction of phase aberration based upon cross-correlation techniques. U.S. Pat. No. 4,817,614 to Hassler et al. and U.S. Pat. No. 4,835,689 to O'Donnell both employ adaptive reduction. Cross-correlation of signals from multiple transducer arrays are employed to enable time delay corrections to be inserted at each transducer which seek to reduce phase aberration. This approach is reminiscent of "rubber mirror" approaches in optics. Such modeling schemes, however, are only ad-hoc attempts to derive a true, noiseless visibility phase. Their results can vary from scan-to-scan, time-to-time, organ-to-organ and patient-to-patient, and thus are of limited replicability and utility in a clinical context. See also, e.g., companion technical articles, O'Donnell et al. "Phase Aberration Measurements in Medical Ultrasound: Human Studies", *Ultrasonic Imaging,* Vol. 10, pp. 1-11 (1988); O'Donnell et al., "Aberration Correction without the Need for a Beacon Signal", IEEE Ultrasonics Symposium, pp. 833-837 (1988); O'Donnell et al., "Phase-Aberration Correction Using Signals from Point Reflectors and Diffuse Scatterers: Measurement", IEEE Transactions on Ultrasonics, Ferroelectrics and Frequency Control, Vol. 35, No. 6, pp. 768-774 (1988). See, also, Hayakawa "Multifrequency Echoscopy for Quantitative Acoustical Characterization of Living Tissues", *J. Acoustical Society of America,* Vol. 69 (6), pp. 1838-1840 (1981) where an approximation of the attenuation coefficient in human tissue is developed.

In an article by Somer et al., "Real-Time Improvement of both Lateral and Range Resolution by Optical Signal Processing", *Ultrasonics Symposium Proceedings* pp. 1002-1005 (1977) an ultrasonic image enhancing process is described in which lateral and axial resolution is improved by using coherent optical filtering in a cross-correlation process. This is an optical approach to achieve an approximate phase aberration correction.

In U.S. Pat. Nos. 4,604,697 and 4,553,437, both to Luthra et al., a hybrid image is produced from the vector addition of amplitude and phase data from an array of transducers at a plurality of frequencies. The overall image is produce by adding partial images. In U.S. Pat. No. 4,586,135 to Matsumoto side lobe reduction is employed utilizing phase data to provide a holographic data set for reconstruction by a synthetic aperture technique.

Auto and cross-correlation also have been used in U.S. Pat. No. 4,397,006 to Galbraith to determine digital time domain filter parameters for noise reduction in seismographic teachings.

Another common approach to enhancement of the signal-to-noise ratio has been to employ relatively high power and high frequency ultrasonic waves in medical applications. Increase in power tends to increase the signal strength relative to the noise. With respect to reducing noise by increasing frequency, the expansion of an ultrasonic beam is inversely proportionally to the beam frequency. Thus, in the biomedical field high-frequency ultrasonic imaging devices are often required to attempt to minimize beam expansion and maximize image resolution. However, high-frequency beams are attenuated substantially as they pass through body tissues, which also reduces signal-to- noise ratio. In fact, the resolution of ultrasound images at depths in bodily tissues greater than about 10 centimeters is so poor as to have limited clinical value. At greater depths, low frequency beams experience less attenuation. But, as the frequency drops the beam expands and the resolution decreases. Thus, frequency compromises are often used to try to optimize resolution for the particular application, but in general, higher than optimal frequencies are used at the sacrifice of depth and clarity of imaging.

Present ultrasonic echography or imaging devices are limited, therefore, in the resolution quality of the images obtained. Images are generally very fuzzy and shadow-filled, and tissue details that require accurate imagery for detection often go undiscovered. Use of current ultrasonic equipment, therefore, requires considerable experience and skill, and even with such experience and skill, the information which can be gleaned from echographic images is very limited and requires subjective interpretation.

The result is that even the high frequency, high power, ultrasonic apparatus most commonly used in medicine today is capable of generating only fuzzy images of tissue targets located at a radial distance in the patient's body of only about a few centimeters from the transducer bank.

Still other attempts have been made to enhance the clarity or resolution of ultrasonic images, but only limited success has been achieved. In U.S. Pat. No. 4,478,085 to Sasaki, the thickness of the ultrasonic transducers was varied over the array to try to minimize beam expansion. U.S. Pat. No. 4,470,305 to O'Donnell employs an annular array of ultrasonic transducers and time delayed pulses to simulate a horn transducer having a sharp focus in the near field. Using this system improved focusing can be achieved up to 20 centimeters, but imaging is accomplished at 3 MHz. The improvement in focus at depth is accomplished in the O'Donnell patent by using variable received signal gains to try to reduce the side lobe noise in the images.

In U.S. Pat. No. 4,677,981 to Coursant, improvement in the ultrasonic echographic image focusing is attempted by using polarization characteristics of the ultrasonic transducers. The disadvantage of this approach is the absence of the initial polarization information and a lack of total intensity. This approach adds little to significantly improve dynamic range and resolution of the ultrasonic images.

Variable frequency ultrasonic scanning also has been used, e.g., U.S. Pat. No. 4,442,715 to Brisken et al., and pitch variation is employed in the device of U.S. Pat. No. 4,664,122 to Yano. Doppler shift also has been employed to detect motion of scanned targets, for example, as is taught in U.S. Pat. No. 4,509,525 to Seo.

Finally, in a published abstract of a paper that was net given or published, I suggested that in underwater acoustic imaging linear and nonlinear imaging techniques could be used to aid in recovery of phase observables for increased dynamic range and image accuracy. I also suggested that techniques from imaging disciplines such as optics and radio astronomy might be applied. Cohen, "Phase Recovery and Calibration with Underwater Acoustic Arrays", *J. Acoustical Society of America,* Sup. 1, Vol. 82, pp. 574-575 (1987). The techniques which might be applicable, how they might be applied and their suitability for medical imaging is not set forth in the abstract.

While modest improvement has been achieved with prior image enhancement techniques, an ultrasonic echography device producing images having good quality has not been achieved. The high levels of noise associated with such signals has rendered consistent, accurate imaging impossible. Accordingly, there is a need for a safe echography apparatus capable of generating high resolution imaging with a high dynamic range.

SUMMARY OF THE INVENTION

Accordingly, it is a primary object of the present invention to provide an echography apparatus and method which will generate high resolution images of stationary and moving target objects in an inhomogeneous medium using ultrasonic signals.

Another object of the invention is to provide echography apparatus and method capable of generating images having a high resolution and target position accuracy in the order of two to ten times greater than those produced by current echography devices.

Another object of the present invention is to provide an ultrasonic echography apparatus and method having a greater dynamic range and greater signal-to-noise ratio.

A further object of the invention is to provide an echography apparatus and method which generates high resolution images of bodily tissue for use in clinical and diagnostic study.

Still another object of the invention is to provide a diagnostic echography apparatus and method which is capable of generating high resolution images at greater depths in the patient's body.

Another object of the present invention is to provide an apparatus and method for generating echographic images which is sufficiently close to real time display to enable use of the images in surgery.

A further object of the present invention is to provide an apparatus and method for generating echographic images having higher resolution at lower frequencies.

An additional object of the present invention is to provide an echographic imaging apparatus and method which provides enhanced image resolution of moving targets.

Still a further object of the present invention is to provide an ultrasonic imaging apparatus and method which can to retrofit to and is usable with existing ultrasonic transducer arrays and correlators to enhance the resolution and dynamic range of the images produced.

To achieve the foregoing and other objects in accordance with the purpose of the present invention, there is provided an echography apparatus and a method to generate high resolution images of stationary and moving target objects. The apparatus and method include an assembly for transmitting a plurality of ultrasonic signals into a selected area of tissue and for receiving the plurality of ultrasonic echo signals. The signals are processed by correlator apparatus which both auto- and cross-correlates the transmitted and received ultrasonic signals. In the improved apparatus and process of the present invention, not only the visibility amplitudes resulting from cross-correlation are mapped, but the phase data also is mapped. Thus, the visibility amplitude and visibility phase data are used to generate data sets for differential phase, closure phase and closure amplitude, and these data sets are partitioned to enable nonlinear noise-reduction processing. Noise reduction preferably includes summing in triplets of the visibility phase data and ratios of groups of four visibility amplitude data, and at least one nonlinear noise-reduction process. In one aspect of the present invention, side lobe noise is reduced from the data by an iterative side lobe subtraction technique, while in another aspect of the invention, the noise is reduced by an iterative hybrid mapping process. These noise reduction processes also can be combined to effect a further increase in dynamic range. Additionally, once the data are partitioned and noise-reduced in accordance with the process of the present invention, sequentially collected data may be processed and then sequentially cross-correlated to show target motion. In a preferred embodiment, the apparatus and method is employed as a clinical diagnostic tool for generating non-traumatic, low-power high resolution imaging of bodily tissue.

BRIEF DESCRIPTION OF THE DRAWING

Additional objects and features of the invention will be more readily apparent from the following detailed description and appended claims, when taken in conjunction with the drawings, in which:

FIG. 8 is a schematic block diagram of a echography device for generating high resolution, high dynamic range images using a hybrid mapping process in accordance with a second embodiment of the present invention.

DESCRIPTION OF THE PREFERRED EMBODIMENT

As is employed in conventional ultrasonic echography apparatus and methods, the high resolution echography system of the present invention employs a plurality of ultrasonic signals which are transmitted from an array of transducers in the direction of a selected target object, such as, an area of selected bodily tissue. A bank of N transducers receives the reflected echo signals which have bounced off the target tissue. These echo signals are processed to yield three-dimensional image map of the target area. In the present invention the processing of ultrasonic signals produces greatly enhanced resolution and improved dynamic range.

Figure 2:
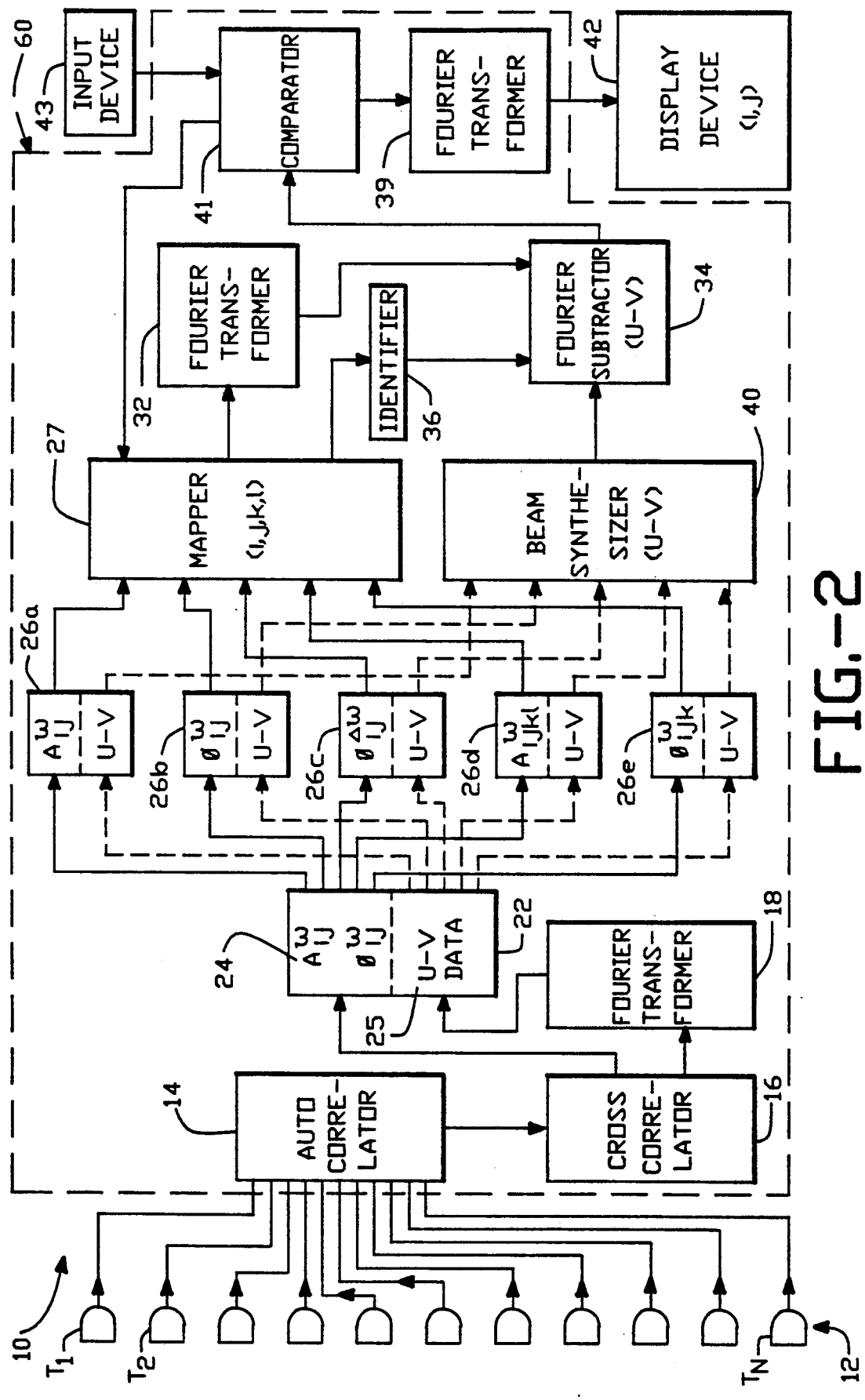
FIG. 2 is a schematic block diagram of a echography device for generating high resolution, high dynamic range images using a side lobe noise reduction process in accordance with one embodiment of the present invention.

In a first embodiment as shown in FIG. 2 according to the present invention, a side lobe noise subtraction process is employed. In another embodiment, as shown in FIG. 8, a hybrid mapping imaging process is employed. Lastly, the process illustrated by FIG. 9 employs a sequential imaging technique to detect target movement.

Side Lobe Subtraction—Overview

Figure 1:
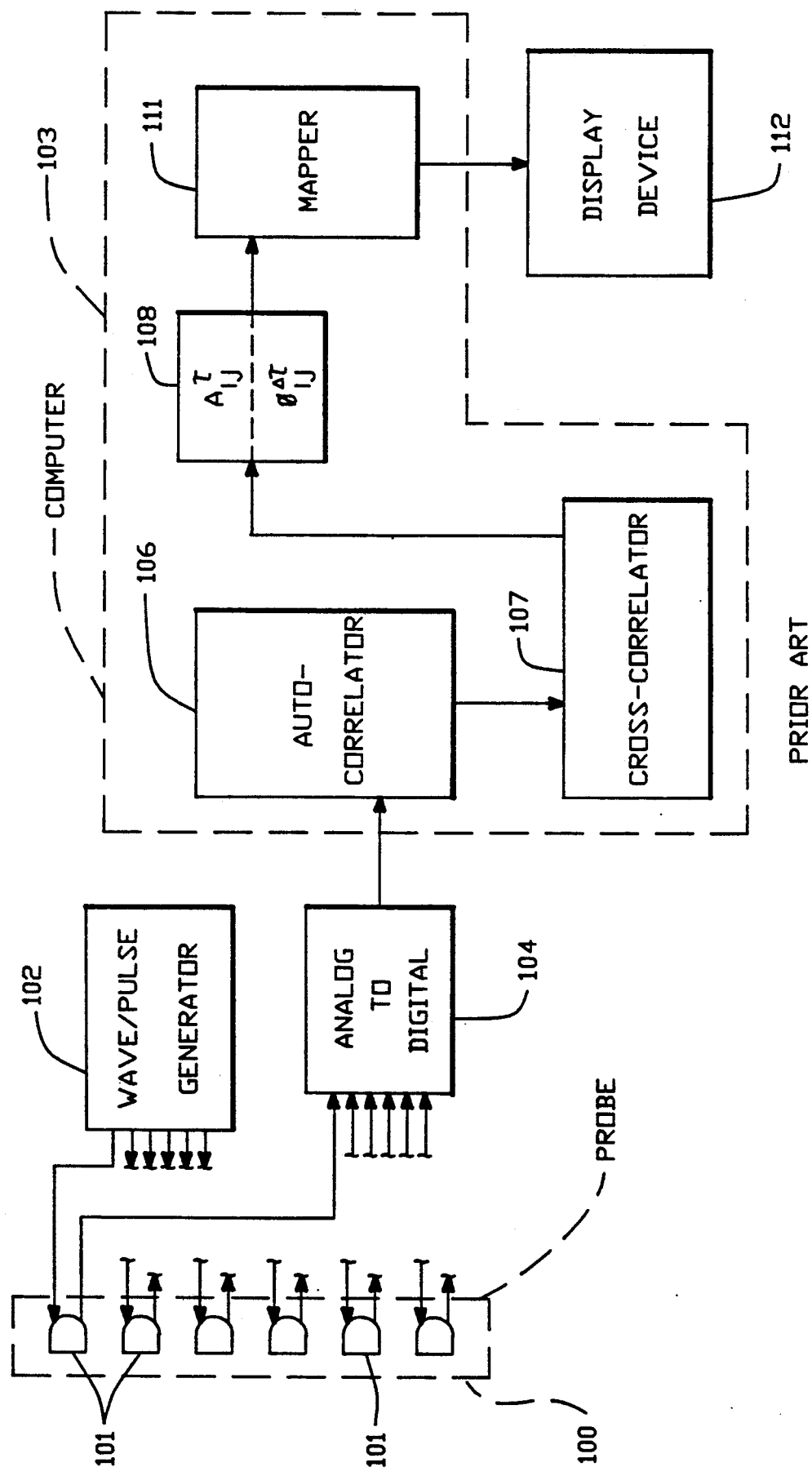
FIG. 1 is a schematic block diagram of a prior art echography device.

Referring now to FIG. 2, a broad overview of the apparatus suitable for performing data partitioning, equipment noise reduction and a side lobe subtraction process is illustrated according to one embodiment of the present invention. As shown in FIG. 2, the wave/pulse generator and analog-to-digital converter of FIG. 1 are not shown for simplicity of illustration, since such components are well known in the art and do not form a novel portion of the present invention.

The ultrasonic echography device, generally designated 10, includes a transmitting and receiving ultrasonic transducer array or bank 12, including transducers $T_1$ through $T_N$. The process of the present invention simultaneously obtains a beam response from each of the $T_N$ transducers. After autocorrelation of the transmitted signal profile and time with the received signal profile and time at each transducer, the outputs of transducer pairs then preferably are cross-correlated at a variety of delays and Fourier transformed to produce the "visibility amplitude" and "visibility phase" for each pair of transducers. The expressions "visibility amplitude" and "visibility phase" are defined below.

While the use of transducer arrays is known broadly, it is an essential and important feature of the apparatus and method of the present invention that an array of transducers be used since it will yield more data than can be captured using a transducer array using a single, large transducer. Moreover, the data captured can be used to eliminate noise by referencing, which is not possible with a single transducer.

Visibility amplitude and phase data are obtained from the transducer array in a conventional manner by autocorrelating, as indicated at 14, the echo signals against the transmitted signal for each transducer. In the preferred form, as shown in FIG. 2, the autocorrelated signals are cross-correlated by cross-correlator 16 to yield visibility amplitudes and visibility phases for each pair of transducers.

The noise reduction apparatus and methods of the present invention, however, are suitable for retrofitting to existing ultrasonic apparatus which does not include cross-correlator 16. Thus, visibility amplitudes and visibility phases also can be obtained by a Fourier inversion of a time domain image produced by autocorrelator 14, if the respective U, V positions of the transducer pairs is input. You essentially can synthesize the visibility amplitudes and visibility phases from autocorrelated outputs. This approach has the disadvantage that it will not permit the creation of a differential phase data set, but it does permit noise reduction by forming "closure phases," "closure amplitudes," side lobe subtraction, and hybrid mapping.

As used herein, therefore, the expressions "correlating" and "correlate" shall include autocorrelation alone or autocorrelation followed by cross-correlation.

Since it is advantageous to increase the data used for mapping and a cross-correlator will allow creation of differential phase data set, the preferred apparatus and method of the present invention includes cross-correlator 16 which cross-correlates each autocorrelated transducer signal with each other autocorrelated transducer signal. The time domain cross-correlated data, expressed in their respective spacial frequencies, then are stored in a data matrix 22 along with the spatial frequencies, otherwise described as the U, V points in the frequency domain, corresponding to the relative positions of the transducer pairs.

In the improved process and apparatus of the present invention, the visibility amplitude and visibility phase data is partitioned further at matrices 26a and 26b, respectively, to permit noise reduction and to yield more useful data for mapping. First, "differential phases", a differential comparison of the visibility phases at different delays, are obtained, at matrix 26c. Second, further partitioning is accomplished by summing of time domain sets of three visibility phases and ratio sets of four visibility amplitudes to yield new data sets called "closure amplitudes" (at matrix 26d) and "closure phases" (at matrix 26e). Corresponding frequency domain data for the closure phases and closure amplitudes also is created. Such summing and ratio forming greatly reduces equipment calibration noise with the closure phase and closure amplitude data and thereby provides two new sets of data which have reduced noise levels.

Figure 5:
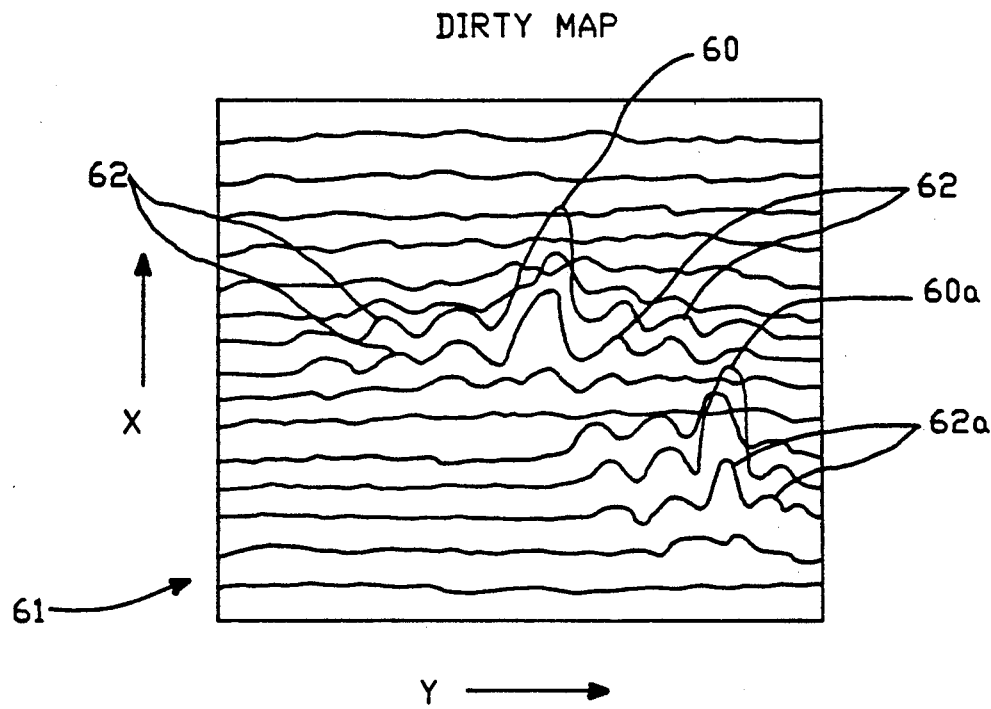
FIG. 5 is a diagram of a synthesized map generated by the device shown in FIG. 1, in time domain.

In the process illustrated in FIG. 2, all five sets of frequency domain data (26a–26e) are now used to produce a map of the image in the time domain (FIG. 5). The visibility amplitude data, as is conventionally the case, has some noise, but is generally relatively accurate. The visibility phase may have had limited use in prior art systems, but its use contributes substantial noise to the data base. Differential phase data similarly has considerable noise and has previously not been used in ultrasonic imaging. Visibility and differential phase data, however, does contain valid data points if the noise can be reduced. Both the closure amplitude and closure phase data have had their noise reduced by the summing and ratios, and they add more valid data points to the data base.

The resulting map (FIG. 5) which is generated by mapping these five data sets is, however, still relatively noisy. Nevertheless, the map has more valid data than found in prior art processes, namely, the closure data and the valid data in the noisy visibility phase data. The map generated by Fourier inversion of these data sets will, by radio astronomical convention, be referred to as a "dirty map." In order to remove noise from the dirty map resulting from these data sets, FIG. 2 illustrates the use of an iterative side lobe subtraction process which cleans the side lobe component of the noise from the data, largely the phase data, to greatly enhance imaging. The side lobe subtraction is based upon a superresolved bright spot identification of the type previously used to remove noise from radio astronomy and radar signals. See, e.g., Hogborn "CLEAN as a Pattern Recognition Procedure", *Indirect Imaging*, Cambridge University Press, pp. 247–254 (1983); and "Aperture Synthesis with a Non-Regular Distribution of Interferometer Baselines," *Astronomy Astrophysics, Suppl.* 15, pp. 417–426 (1974).

Figure 6:
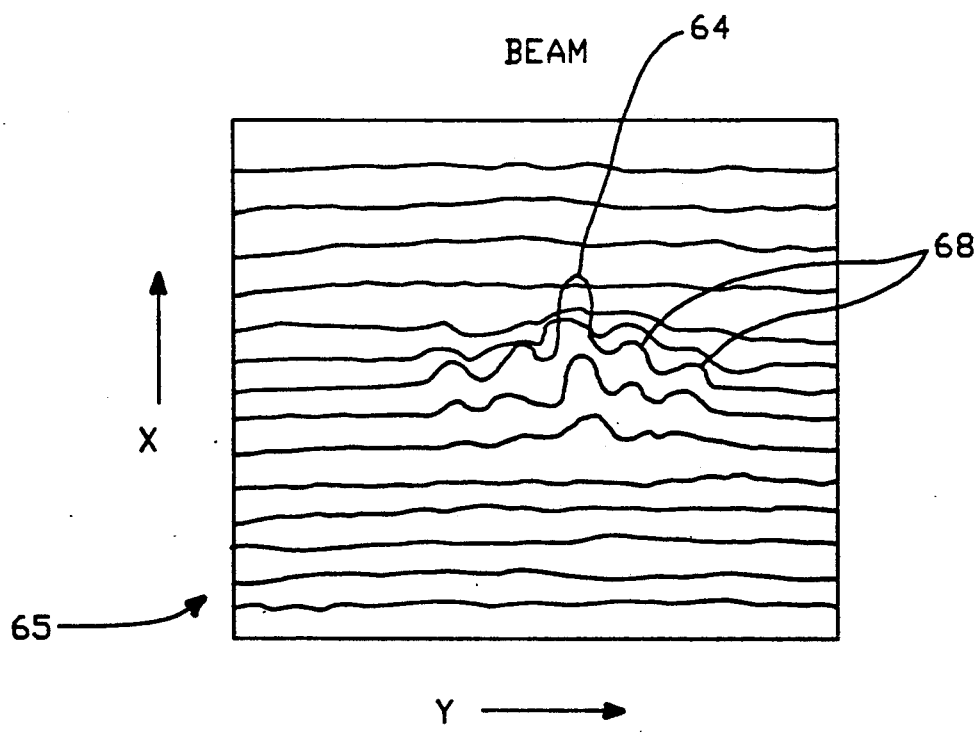
FIG. 6 is a diagram of the beam side lobe pattern in the time domain of the aperture of the transducer array.

Thus, a bright spot (60 in FIG. 5) is identified (by identifier 36) on the dirty map, and it is assumed that that bright spot shows an actual portion of the structure of the target. Since it is known that any array 12 of transducers used to synthesize an aperture will produce complex side lobe noise around a valid data point due to incomplete and/or non-continuous apertures, the characteristic side lobe noise pattern for the particular array 12 of transducers, T, used to create the time domain data is generated (FIG. 6). The synthesis of the beam side lobe aperture pattern is accomplished by mapping the U-V data from the five data matrices (26a–26e), that is, doing a Fourier or Fourier-like inversion over all solid angles to yield a time domain X,Y map. Effectively, the beam pattern, with its sidelobes, has been generated by Fourier inversion of the aperture's representation in the time domain.

A subtraction of the side lobe aperture data map (FIG. 6) from the data around the selected bright point 60 on the dirty map (FIG. 5) is then undertaken at subtraction box 34. This subtraction preferably takes place in the frequency domain and eliminates the side lobe noise around data point 60 on the time domain map and thereby "CLEANS" the map. It should be noted that a time domain subtraction also would be possible.

A comparator 41 then looks at a partially noise-reduced map and, in most instances, finds that it still has too much noise. The CLEANED map is then scanned for another bright point, e.g., 60a, and the same side lobe noise pattern (FIG. 6) is subtracted from the data around the second bright point 60a. This process is repeated, iterated, until comparator 41 finds that the map (FIG. 7B) meets the comparator's criteria for noise removal, usually approaching a thermal noise limit, at which point the cleaned map is displayed at output device 42.

The addition of valid data points through the use of closure amplitudes and closure phases, plus the retention of visibility and differential phases and CLEANING of side lobe noise from the phase data and the visibility amplitudes, results in a displayed image with more data points, higher resolution, and lower noise, greater dynamic range. The improvement in resolution as compared to the prior art is estimated to be 2 to 10 times, and the improvement in dynamic range is estimated to be 10 to 100 times.

The power required to generate an echographic image is directly proportional to the fourth power of the distance between the target and the transducer. Thus, if the dynamic range, signal-to-noise ratio, can be increased by 10 times using the present process, this increase can be used to increase the depth of imaging or decrease the power required, or combinations of both. Thus, if the same dynamic range is acceptable, the distance of imaging can be increased by the fourth root of the dynamic range increase, namely, 70 to 80% distance increase for a 10 times increase in dynamic range and a 300% increase for a 100 times increase in dynamic range. The power reduction possible is directly proportional to the increase in dynamic range. Thus, a 10 times increase in dynamic range will enable a 10 times reduction in power for the same image. Similarly, a 100 times increase in dynamic range will enable a 100 times reduction in power required to produce the same image.

SIGNAL CORRELATION

As shown in FIG. 2, an array or bank 12 of N transducers, T, are geometrically positioned to transmit a signal in the direction of a target object (not shown), such as human tissue. The greater the number N of the transducers, the larger the geometrical aperture image will be obtained. The transducers 12 need not be positioned in a linear array as shown in FIG. 1, and in the usual case the transducers will be mounted in a two-dimension array on a common frame or probe at predetermined fixed relative positions.

In the preferred form of the invention, transducers $T_1$ through $T_N$ each transmit a broad band pulse or Doppler-shifting continuous wave signal and also receive the echo or reflected signal upon return to the transducers. The transmitted signal is preferably of known amplitude and phase, which is input to computer 60 from the generator (not shown) driving the transducers, as indicated at input 61. The transmitted ultrasonic signal from each transducer propagates through free space, until it comes into contact and bounces off the selected area of tissue. The reflected wave returns toward its transducer source as an echo signal and is received by the same transducer. The echo signal also will be received, however, by adjacent transducers, but the signal will be received differently by the adjacent transducers. Thus, the different projected distance, different properties and noise characteristics of each transducer, and the reflectivity dispersion differences caused by the differing layers of the intervening inhomogeneous medium all contribute to the differences in the received signals.

It will be understood that a separate set of transmitter and receiver transducers also can be used in the process and apparatus of the present invention, as long as the respective phase and amplitude data can be correlated.

Figure 3:
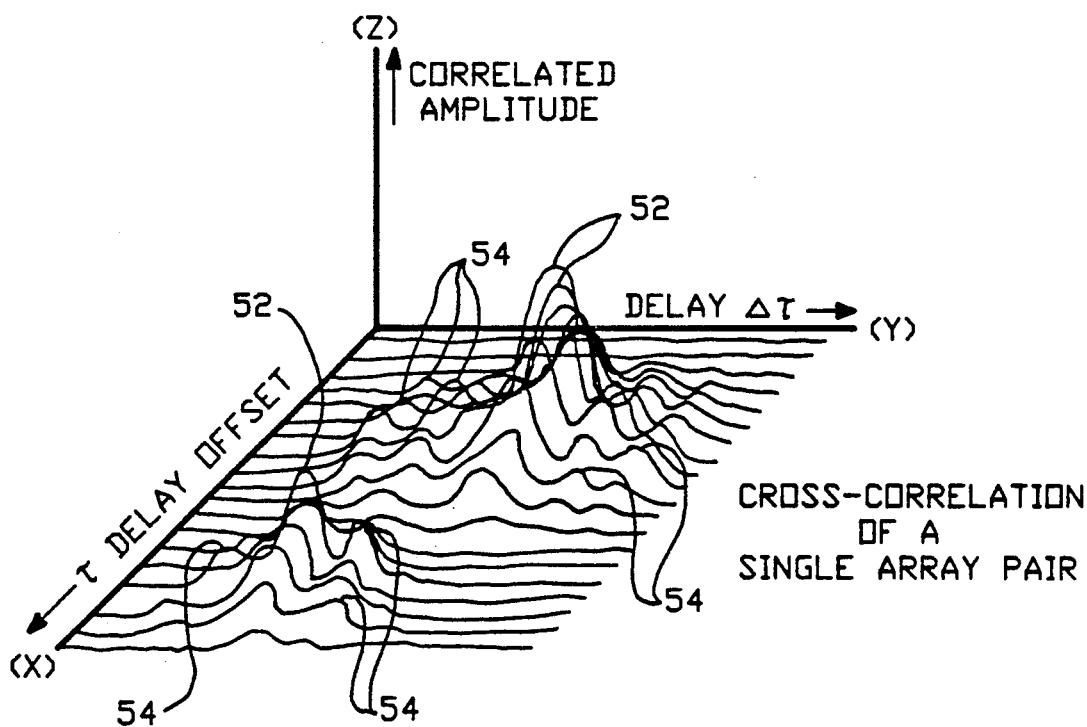
FIG. 3 is a three-dimensional, time domain plot of the cross-correlated output from a single pair of transducers in the system of FIG. 2.

The individual transducers receive the reflected signals over a range of time delays corresponding to the position, distance, contoured structure of the target and refractivity of the medium. The delays are relative to the speed of sound of the probagation medium. The phase and amplitude of the echo signal received by each transducer is measured at each instant of time. A correlation of the amplitude and phase differences between the transmitted and received signals is used to construct a three-dimensional pictorial plot of the selected tissue, as shown in FIG. 3.

The autocorrelator, indicated diagrammatically by box 14, is adapted to autocorrelate the transmitted and received signals for each transducer over the propagation radial time delay ($\tau$). The probagation time delay is given by:

$$\tau \approx 2D/C_s$$

where, for suitable units $\tau$ is time in seconds, D is distance in centimeters, and $C_s$ is medium probagation sound speed. The autocorrelator executes the following well-known algorithm (or its discrete equivalent) to perform an autocorrelation between the transmitted and received signals for each transducer.

$$A_\eta(\tau) = \int R(t) R(t-\tau) \, dt \qquad [1]$$

where, $R(t)$ is the transmitted signal transmitted at time, t, $R(t-\tau)$ is the echo signal, t is the present initial time, $\tau$ is a time offset, which is defined as the signal propagation time period between transducer transmission and reception, and $A_\eta$ is the autocorrelated signal for each transducer 1 through N in the bank of N transducers.

The outcome of the autocorrelation is to determine where the amplitudes and frequencies are common between the transmitted and received pulse signal over the offset period of time ($\tau$) for each transducer.

A cross-correlator step, as indicated in FIG. 2 by box 16, is adapted to cross-correlate pairs of autocorrelated signals. Cross-correlator 16 executes the following algorithm (or its discrete equivalent) to perform a cross-correlation between two autocorrelated signals $A_1$ and $A_2$:

$$A_1 A_2(\tau) = \int A_1(t) A_2(t-\tau') dt \qquad [2]$$

where, $\tau'$ is the geometric time delay for propagation, between the transducer pairs. Accordingly, $\tau'$ is defined by the time difference of arrival caused by the transverse position of the target source and is given by:

$$\tau'^2 = (D_{12} C_s \cos\theta \cos\phi)^2 + (D_{12}/C_s \cos\theta \sin\phi^2 - \cos\theta_2 \cos\phi_2 - \cos\theta_2 \sin\phi_2)$$

where, $D_{12}$ equals the distance between transducers $T_1$ and $T_2$, $C_s$ is propagation sound speed, and $(\theta_i, \phi_i)$ correspond to the two dimensional direction cosine angles delineating the target position, as viewed from transducers $T_1$ and $T_2$, respectively.

The cross-correlator performs, per given $\tau'$, the total number of possible different cross-correlations between the N autocorrelation signals. For example, if N equals 5, the following cross-correlations are performed:

| | | | |
|---|---|---|---|
| 1 × 2 | 2 × 3 | 3 × 4 | 4 × 5 |
| 1 × 3 | 2 × 4 | 3 × 5 | |
| 1 × 4 | 2 × 5 | | |
| 1 × 5 | | | |

Each digit (1-5) represents an autocorrelated signal from transducer bank 12, in the example N=5.

The purpose of the cross-correlations is to determine the amplitude and phase, density distributions of the entire geometric aperture defined by transducer bank 12. Cross-correlation 16 determines the phase offsets due to the relative physical position differences between the cross-correlated pairs of transducers relative to the target, which differences are fixed as a result of the configuration of the transducer bank 12.

Referring to FIG. 3, a three-dimensional, time domain plot of a selected pair of cross-correlated transducers is shown. In the three-dimensional plot, the time offset (t) corresponds to the X axis, $\tau$ corresponds to the Y axis, and the amplitude peaks 52 are plotted on the Z axis. Each of the correlated lines 50 corresponds to the yield of the cross-correlation between the pair for a given delay offset. The presence of peaks 52 at specific coordinates (X,Y,Z) corresponds to the recognition of a structure within the target object of the transducer pair. Amplitude peaks 52 also are accompanied by unavoidable side lobe noise peaks 54, the presence of which diminishes the resolution of the plot of FIG. 3, were it to be displayed as part of a plot of the synthesized aperture. While shown as a raster scan type of display, it will be appreciated that gray-scale or false color pixel-based, displays also can be produced for the various maps discussed herein.

A Fourier-like transformation, defined as a Laplace transform which takes the function into frequency domain (for example, the Fourier transform of a linear function or the frequency domain transform of a Fourier-transformed nonlinear function), as indicated by box 18, generates a power density function (PDF) of the time domain plot shown in FIG. 3 by converting the plot into the frequency domain.

Transformer 18 Fourier transforms each of the individual cross-correlated signals to convert the time domain plots for the entire array of transducers into the frequency domain. Transformer 18 executes a Fourier transform to yield spatial frequency data (U-V), which is used to synthesize the beam and side lobe response.

The beam and side lobe response is inherent to the particular configuration of array 12 of the transducers. Each visibility amplitude and phase pair is assigned a location (U,V) corresponding to its position in the geometrical aperture created by array 12.

The beam and sidelobe response is determined by assigning a two-dimensional position to each transducer and executing a Fourier transform of this array of delays to achieve a two-dimensional spatial frequency spectrum characterized so that each transducer pair corresponds to a (u,v) point. This collection of two-dimensional spatial frequency data is referred to herein as the "u-v" plane. Fourier inversion of the u-v plain generates the beam and sidelobe response.

Each (u,v) point is assigned its corresponding transducer pair cross-correlation amplitude and phase. The representation of the u-v plane in the Fourier transformed frequency domain yields the data then to be retransformed to produce the "dirty beam". The Fourier transformed frequency domain of the cross-correlation data yields information which can then be Fourier inverted to yield a "dirty map".

For convenience, the following table summarizes the principle domains of the data on its way to be formed into an image in a standard aperture synthesis approach.

| Data | Stage 1 | Stage 2 | Stage 3 |
|---|---|---|---|
| Transducer Positions | Position Differences | u-v plane | DIRTY BEAM |
| Output of Transducer pair | Cross-Correlation | visibility amp, phases | DIRTY MAP |

Stage 2 are frequency domain quantities.

Figure 4:
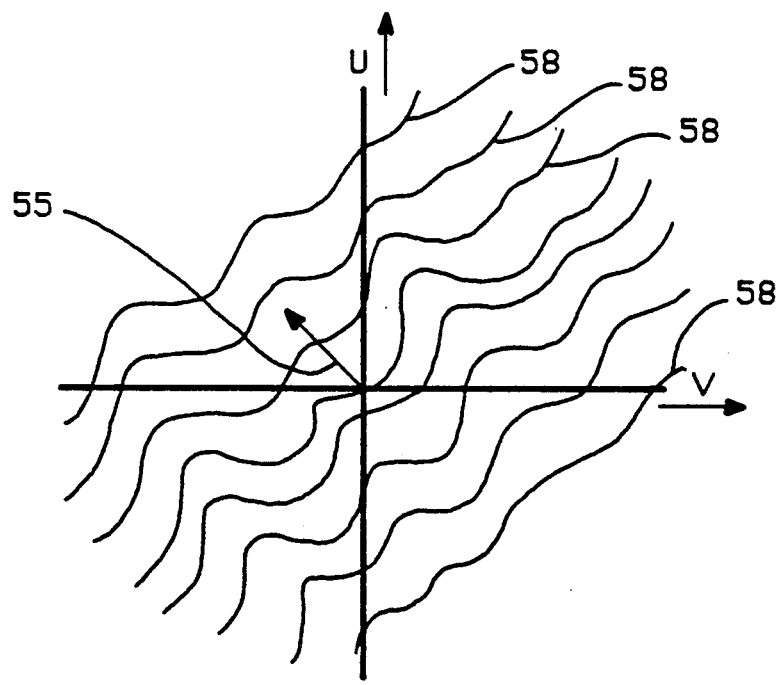
FIG. 4 is a frequency domain plot illustrating the amplitude distribution from all cross-correlated transducers.

Referring now to FIG. 4, a frequency domain distribution plot of the correlated amplitude of all cross-correlated pairs of transducers is shown. The visibility amplitude data is plotted with its respective spatial frequencies on the U-V plane as smooth sinusoidal-like frequency waveforms 58. Amplitudes, as indicated by arrow 55 out of the page, show the presence of structure, and a peak 52 from the plot of FIG. 3 would appear as a point on one of lines 58 in FIG. 4.

Visibility amplitudes and phases are stored over the various spatial frequencies in matrix 24 along with the U-V data matrix 25 in FIG. 2. The visibility amplitude and phase data and related spatial frequencies are expressed here in complex numerical notation (i,j) as a function of transducer array elements. The visibility amplitude, $A_{ij}^\omega$, and the visibility phase, $\phi_{ij}^\omega$, data are frequency domain representations of the data.

It should be noted that the present interferometry process is operating on near field data and accordingly uses near field corrections, well known in interferometry, at the correlator.

Creation and Partitioning of New Data

As will be seen from FIG. 1, the visibility amplitude data, $A_{ij}^\omega$, is generally the component that has been used for prior art echographic imaging mapping.

In the improved process of the present invention, not only is the visibility phase data, $\omega_{ij}^\omega$, used, but three additional data sets are created and used.

Initially a differential comparison of the visibility phases, as determined by previous cross-correlation at different incremental time delays, $\tau$, will yield "differential phase" data, $\omega_{ij}^{\Delta\omega}$. These data are generated from the noisy visibility phases, and accordingly is similarly relatively noisy, but contains valid data points. The differential phases are shown as stored in matrix 26c.

In the field of radio astronomy it has been demonstrated that the vector summing of any three visibility phases from a transducer array will cancel out equipment calibration noise. Also, and very importantly, any phase differences ("phase aberration") caused by inhomogeneities in the propagation medium will be cancelled. Effectively, the visibility phase, contaminated by phase terms not indicative of the target structure and/or position, is replaced by a new type of phase, based on three transducers, rather than two.

This new phase data, constructed of triplets of visibility phases, is called "closure phase" data. It can be shown by characterizing the actual visibility phase, $\phi_{ij}{}^w$, into its various components:

$$\phi_{ij}{}^w = \phi_{ij} + (\theta_i - \theta_j) + (\gamma_i - \gamma_j) + (\beta_i - \beta_j)$$

where, $\phi_{ij}$ = the true visibility phase of the target, $\theta_n$ = internal phase of transducer $T_n$, $\gamma_n$ = phase term corresponding to position uncertainty of transducer, and $\beta_n$ = phase deviation caused by inhomogeneity in the propagation medium, as measured by transducer $T_n$.

The closure phase, therefore, is:

$$\begin{aligned}\phi_1{}^w{}_{jk} &= \phi_{ij} + \phi_{jk} + \phi_{ki} \\ &+ (\theta_i - \theta_j) + (\theta_j - \theta_k) + (\theta_k - \theta_i) \\ &+ (\gamma_i - \gamma_j) + (\gamma_j - \gamma_k) + (\gamma_k - \gamma_i) \\ &+ (\beta_i - \beta_j) + (\beta_j - \beta_k) + (\beta_k - \beta_i) \\ &= \phi_{ij} + \phi_{jk} + \phi_{ki}\end{aligned}$$

Clearly the contamination terms, particularly the $\beta n$ terms which gives rise to phase aberration, disappear in the closure phase construction. Using closure phases, therefore, is much more than a mere adaptive, ad hoc approximation typical of the prior art; it is an exact solution approach which eliminates phase aberration. Thus, all possible combinations of three visibility phases in the array are vectorially summed and those sums are stored in matrix 26e as "closure phases," $\phi_{ijk}{}^\omega$.

Similarly, it is known in radio astronomy that if a ratio of four visibility amplitudes is made, the equipment calibration errors in the visibility amplitude data will be eliminated. This is shown by characterizing a closure amplitude for transducers k, l, m, n as $A_{klmn}$, where $A_{ij}$ equals the measured visibility amplitude for transducer pairs i,j. $A_{ij}$ is given by:

$$A_{ij} = G_i G_j \Gamma,$$

where, $G_i$ and $G_j$ are the gain factors, with uncertainties, of transducers i and j, and $\Gamma_{ij}$ is the true visibility amplitude for transducer pair ij. Hence, $$A_{klmn} = \frac{G_k G_l G_m G_n \Gamma_{kl} \Gamma_{mn}}{G_k G_m G_l G_n \Gamma_{km} \Gamma_{ln}}$$

This represents a ratio of visibility amplitudes in which the noise-ridden gain factors cancel out. In short, the closure amplitude $A_{klmn}$ is noise free from uncertainties in transducer gain. Thus, all possible combinations of four visibility amplitudes in the array are stored in data matrix 26d as "closure amplitudes," $A_{ijkl}{}^\omega$.

Any non-zero value in the closure phases and non-unity ratio for the closure amplitudes represents data indicating the presence of structure in the target. Accordingly, these data can be used in image mapping as new usable data points not previously employed in ultrasonic imaging. Moreover, since the vectorial summing and ratios eliminate equipment calibration noise, the amplitude data is relatively reliable and the phase data improved dramatically, particularly as compared to the visibility and differential phase data.

In phase summing and amplitude ratios the noise of one transducer relative to another can be cancelled out using the present process. The closure amplitudes and closure phases are a new set of data or observables which are separate from the visibility amplitude and visibility phase data. Thus, by including closure amplitude and closure phase data in the present process, still additional data is available for use in processing the signal to increase the signal-to-noise ratio.

Accordingly, the next step in the process of the present invention after correlation, is the vector summing, ratio forming and partitioning of the frequency domain data for the visibility amplitudes and the visibility phases. The visibility amplitude data may be stored in the matrix 26a, the visibility phase data in matrix 26b, the differential phase data in matrix 26c, the closure amplitude data in matrix 26d, and the closure phase data in matrix 26e.

U-V data indicating the beam and side lobe response for the visibility and closure amplitudes and phases and differential phases are graphically shown as stored in corresponding sub-matrices.

Thus, the vector summing of data in the process of the present invention yields additional usable data.

The partitioning step in itself is a novel step which provides a data set with significant reduction in noise and phase aberration.

The partitioning of the data also provides a data set uniquely untouched by phase aberration effects, since the relative differences in phase caused by refraction effects in the intervening medium will cancel out in closure phase summing, the component which causes phase aberration will not appear in the closure phase. Using the closure phase in mapping, therefore, will produce an image unencumbered by phase aberration.

Noise Reduction by Side Lobe Subtraction

While the data of matrices 26a-26e is significantly increased over conventional processes, it still contains substantial noise, particularly in the phase data. It would be possible, however, to simply map the data without further processing and obtain improved resolution and dynamic range. If one were to map the visibility amplitudes, closure amplitudes and closure phases, greater image resolution would be achieved simply by the addition of the closure data points to the traditionally used visibility amplitudes.

In the present invention, however, further noise reduction processing is employed to effect enhancement of all data, but particularly the noisy phase data. This processing, as shown in FIG. 2, takes the form of subtraction of the complex side lobe noise inherent in synthesized apertures.

It is known that a synthesized transducer beam or aperture, such as results when a plurality of transducers are used in a transducer array, will be "noisier" than a filled (single transducer) aperture. Thus, when a synthesized transducer beam is used, which almost always is the case in ultrasonic imaging, there always will be a degree of uncertainty in the relative phase and amplitude data coming from each transducer when such transducer is compared to a fixed point in the synthesized aperture. While synthesized ultrasonic beams or apertures have greater versatility in the beam characteristics than a filled aperture, the inherent increase in beam noise to signal ratio compromises this enhanced versatility.

The next step in signal processing, therefore, is to synthesize a "dirty" map of the area of the synthesized aperture. The dirty map is defined as the Fourier inversion of the visibility amplitudes and phases and will also indicate an inversion and modeling of the closure amplitude and closure phases. For example, in the simple case of fourier inversion of visibility amplitudes and phase only, the dirty map, I(x,y), is given by (for each transducer $T_N$):

$$I(x,y) = \sum_{N=1}^{k} V(U_N, V_N) \exp\{-i2\pi(U_N x + V_N y)\}$$

where $V(U_N, V_N)$ is the visibility function (visibility amplitude and visibility phase) for a given (u,v) pair.

Mapping, as indicated in FIG. 2 by mapper 27, uses the frequency domain data in submatrices 26a–26e, and a typical dirty map, generally designated 61, is shown in FIG. 5. Mapping of the data in matrices 26a–26e into map 61 of the synthesized aperture is well known in the art and will not be repeated herein.

Map 61 contains a multiplicity of peaks 60, 60a, which correspond to brightness structures in the target object. It is important to note that, at this time, map 61 still contains high levels of noise, as is evident by the presence of peaks 62 and 62a, which are produced by side lobe response inherent to the aperture configuration.

The side lobe subtraction process uses the U,V data in matrices 26a–26e to simulate a synthesized beam (a "dirty beam") response of the transducer array to single point source. The dirty beam is the synthesized beam point response, of the array. It is otherwise related to the transfer function of the array and is given by:

$$P(x,y) = \sum_{N=1}^{k} \exp\{-i2\pi(U_N x + V_N y)\}$$

It will be noticed that I(x,y) represents the convolution of the dirty beam with the visibility function.

The beam synthesizer 40 is responsible for converting or mapping the entire U,V data into a beam power pattern in the frequency domain. The beam power pattern which can be mapped from the U,V data in effect represents the side lobes which would inherently be generated if the target were a point structure or source. Thus, the geometry which is peculiar to the particular array 12 of transducers on the probe would always produce the same side lobe noise on the various sides of the point source. If the transducer array 12 were reconfigured, the side lobe noise would change, but for any fixed array there is only one beam power pattern of the side lobe noise about a point.

If such U,V data were mapped, FIG. 6 shows a typical beam response map 65 which has a central peak 64 representing the point source and side lobes 68 at positions and with amplitudes which are characteristic of the aperture geometry.

Figure 7A:
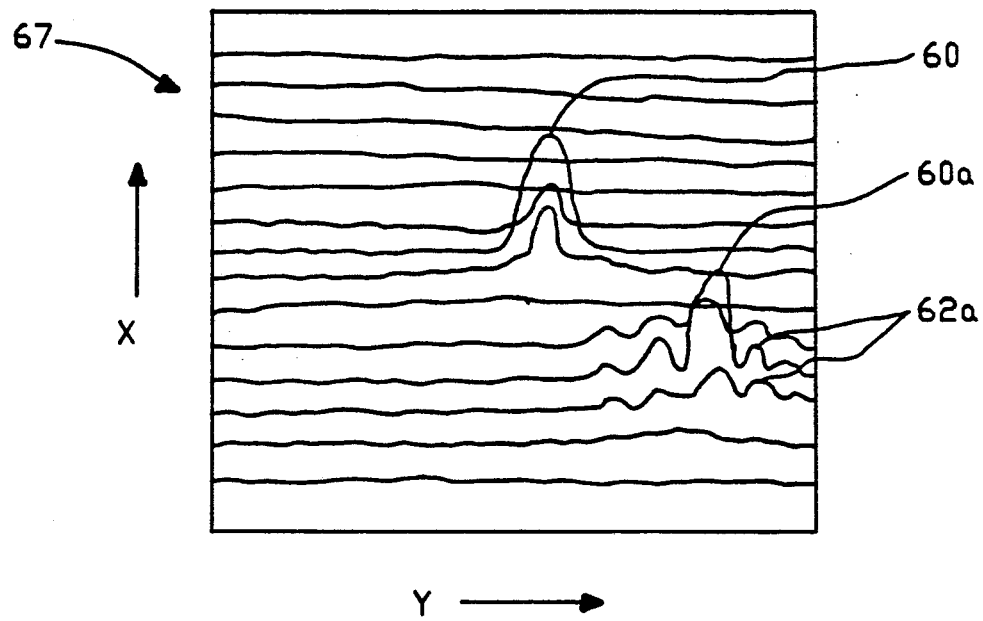
FIG. 7A is a partially cleaned version of the map shown in FIG. 5 after subtracting the beam side lobe pattern of FIG. 6 from one point on the map of FIG. 5.

To remove the side lobe 62 noise from map 61 of FIG. 5, the present process employees an iterative subtraction technique. Referring to FIG. 7A, a partially cleaned version of the map of FIG. 5 is shown after the iterative side lobe subtraction process is performed. The iterative process includes the following steps:

1. A brightness peak 60 on map 61 of FIG. 5 is identified by identifier 36. This identification is mathematically performed on the data for map 61 by looking for the greatest peak.

2. The map of FIG. 5 is inverse Fourier-like transformed into the frequency domain, as indicated by transformer box 32, in preparation for a side lobe subtraction step to remove noise in the frequency domain.

3. In the side lobe subtraction step, the U,V beam response data for a point source is subtracted from the data surrounding brightness peak 60 of FIG. 5, as indicated by subtractor box 34. This step removes the side lobes 62 around point 60 from the map of FIG. 5 to yield a "cleaner" map 67 with side lobe response removed as shown in FIG. 7A.

4. The "cleaner" map 67 of FIG. 7A is then scanned or comparated by comparator 41 to criteria as to noise levels. Input device 43, for example, can specify that the dynamic range of map 67, the range of maximum signal to the noise level, must exceed a certain amount, or that cleaning will continue until all brightness points on map 61 of FIG. 5 which are at least one-half the intensity of the brightest point 60 shall have been cleaned. In map 67 of FIG. 7A, for example, cleaning of side lobe noise 62 from around brightness point 60 has had little effect on side lobe noise 62a proximate the highest second brightness point 60a.

5. Accordingly, if resolution does not yet meet comparator 41 criteria, map 67 is re-inverted into the time domain and second brightness point 60a is identified by identifier 36.

6. The somewhat cleaner map 67 is then re-inverted to the frequency domain, and subtractor 34 subtracts the same beam side lobe pattern from the data surrounding next brightest point 60a to yield map 69 of FIG. 7B.

7. The newly cleaned map 69 is compared by the comparator again, and if it does not meet the criteria, the map is returned for another bright point selection and beam side lobe subtraction.

Figure 7B:
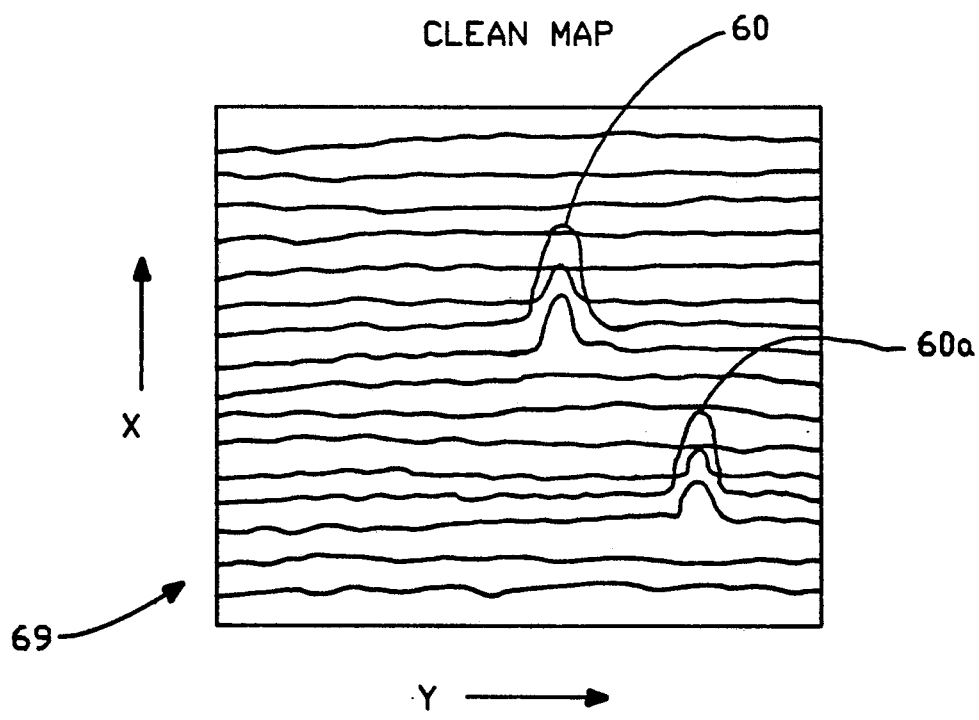
FIG. 7B is a further cleaned version of the map of FIG. 5 after subtracting the beam side lobe pattern from a second point on the map of FIG. 5.

8. If the comparison between the newly cleaned map yields an acceptable outcome, the cleaned map of FIG. 7B is transformed by Fourier-like transformer 39 from the frequency domain to the time domain and displayed on display output device 42.

By using iterative side lobe subtraction, a significant amount of the noise in the phase data is removed, as well as some noise in the visibility amplitude data and the closure amplitude data. The result is additional usable data is gleaned from five sources not heretofore used in ultrasonic imaging and the signal-to-noise ratio is improved for all data.

The resulting images which are displayed using the present process and apparatus are significantly improved over prior art echography images. Specifically, the images generated by the present invention provide increased dynamic range in the order of 10 to 100 and 2 to 10 times greater resolution.

Noise Reduction by Hybrid Mapping

In another aspect of the present invention, noise is reduced by a hybrid mapping approach. As will be seen from FIG. 8, the process again includes the creation of the additional useful data sets for differential phase, closure amplitudes and closure phases. Instead of cleaning all data sets by side lobe subtraction, however, the process and apparatus of FIG. 8 employs hybrid mapping, another signal processing technique used in radio astronomy.

Referring now to FIG. 8, a schematic block diagram of a second echography device for generating high resolution, high dynamic range images from a hybrid mapping process in accordance with a second embodiment of the present invention is shown. The hybrid mapping process provides a second means for signal processing the data obtained from transducer bank 12. This second process is particularly useful when the visibility phases are highly corrupted by systematic noise, which usually is the case.

Image side lobe noise levels are removed and image resolution and dynamic range are improved through a hybrid mapping or self-calibration-like scheme. Hybrid or model data is used in place of undesirable actual phase data, and is substituted in production of the map. In this manner, bad phase data points which create noise are removed, and model data are inserted to improve the resulting image's resolution and dynamic range.

The operation of the transducer bank 12, autocorrelator 14, cross-correlator 16, Fourier transformer 18, data storage device 22 for storing the visibility phase and amplitude data and the U-V data, and the partitioning of such data into five submatrices 26a through 26e is identical to that illustrated and described in relation to the first embodiment shown in FIG. 2. At this stage, map 61 (FIG. 5) contains high levels of noise, usually phase noise, resulting in poor resolution and poor dynamic range.

In hybrid mapping, however, the basic assumption is made that the amplitude data is more likely to be correct and the phase data corrupted. This is the same assumption conventionally used for the prior art ultrasonic imaging process of FIG. 1.

Accordingly, the first step in the reduction of noise by hybrid mapping preferably is to map only the visibility amplitude and the closure amplitude data in the frequency domain by mapper 27a, which would produce a map similar to map 61 in FIG. 5, but with less data being mapped, since the phase data is not present.

An identifier 36a again mathematically would identify a brightest point, a point equivalent to 60 on the map of FIG. 5. This brightest point then would be used to generate model phase data. By assigning the brightest point as the zero phase point and assuming that there is only one bright point in the aperture, the brightest point data is inverted, as indicated by Fourier-like inversion box 52, into the frequency domain to yield sets of model amplitude and model phase data for a one point structure in the particular aperture. These model data points result from a brightness distribution algorithm known and conventionally used in radio astronomy. .See, e.g., Hogbom, "CLEAN as a Pattern Recognition Procedure," *Indirect Imaging*, Cambridge Univ. Press, pp 247-254 (1983).

The model amplitude and phase data is compared by comparator means 41a to the frequency domain data in matrices 26a-26e, as indicated by bracket 53. The model amplitude data will usually agree very closely to the actual amplitude data, but the model phase data will differ substantially from the actual phase data. Data substitution is then accomplished, as indicated by hybrid data input box 51, by substituting the model phase data for the actual phase data in matrices 26b, 26c and 26e. By a goodness-of-fit comparison by comparator 41a, some model amplitude data points also may be substituted into the amplitude data in matrices 26a and 26d.

Once the model data has been substituted, a new amplitude-based map is generated. If there was only one target point in the aperture, which will not occur in biomedical applications, the substitution of model data for actual data for the only bright point would finish the data processing. In virtually all cases, however, a second bright point 60a is identified. Second bright point 60a is now used, in combination with first bright point 60, to generate a more complex, two-point set of model data. This is done by a Fourier-like transform at 52 using the brightness distribution algorithm and the assumption that there are two bright points. Again, the model data are compared and substituted into matrices 26a-26e. This process is repeated and a third bright point identified and a three bright point inversion is made to generate a still more complex set of model data.

As model data is substituted, bright points on the map caused by noise will tend to diminish and vanish, leaving bright points corresponding to structure. Thus, one does not start by identifying 10 bright points since some of them could be noise which would disappear if the iteration is done by adding one bright point for each loop.

This iterative process of data substitution continues until there is a high degree of fit of the amplitude data with the modeled amplitude data, typically between 10 and 100 iterations. Goodness of fit may be defined by minimization of the Chi-squared residuals, or other criteria. When a high degree of fit occurs, most of the phase data and some of the amplitude data will have been substituted for by hybrid or model data, and the side lobe noise in the phase data will have been greatly reduced.

The comparator now causes all the data in matrices 26a-26e to be mapped, as indicated by bracket 50, and displayed at output device 42a. The result again is an enhancement of resolution through the presence of additional data and the reduction of noise by hybrid mapping.

Combined Processing

It is possible to use either side lobe subtraction or hybrid mapping to reduce ultrasonic signal noise. It also is possible to use both processes. In the preferred form, noise is reduced first by side lobe subtraction, and then the resulting cleaned data is processed by hybrid mapping. This order is preferred over the reverse order of processing.

Motion Detection

Figure 9:
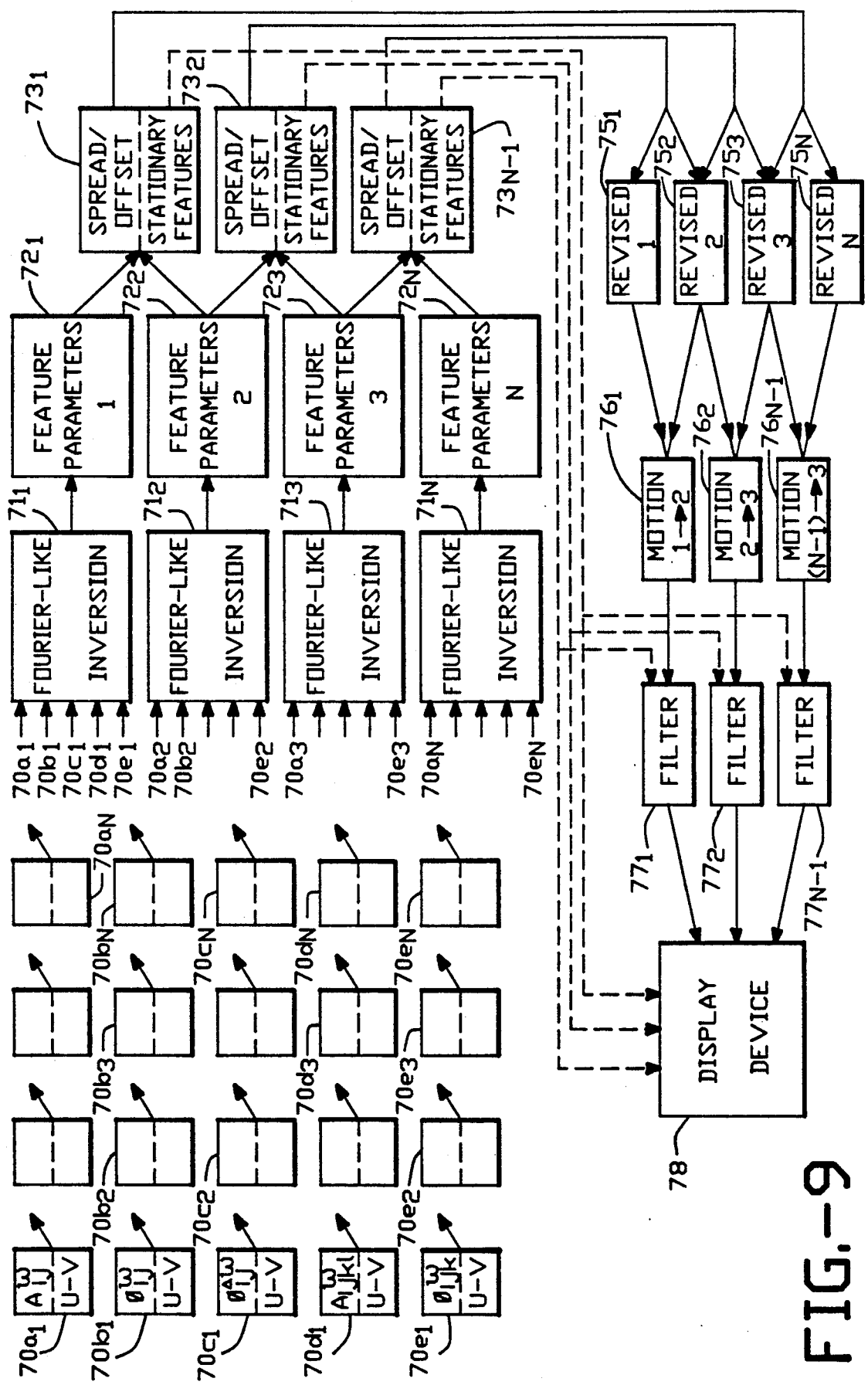
FIG. 9 is a schematic block diagram of an echography device constructed in accordance with the present invention and useful for generating images showing motion of the target object.

The apparatus and method of the present invention can be used to determine the presence of and to display motion of structure in the target area. FIG. 9 illustrates an echographic signal processing system in which the motion or structural change of any feature within the echographic map may be precisely identified. In this aspect of the present invention sequentially generated data sets are used to detect motion.

In the process of FIG. 9, the transmitted and echo signals are correlated and partitioned as described in connection with FIG. 2. Thereafter, the data is cleaned by side lobe subtraction (FIG. 2), or it is hybrid mapped (FIG. 8) to the point that the noise-reduced and data-increased map is ready for display.

Instead of displaying the map from the process of FIG. 2 or FIG. 8, the visibility amplitude, visibility phase, closure amplitude, closure phase and phase difference data is processed further by an autocorrelation comparison with similar data captured at sequential times after the first set of data. FIG. 9, therefore, shows noise-reduced data at time=1 in the matrices $70a_1$, $70b_1$, $70c_1$, $70d_1$, and $70e_1$. These are equivalent to the matrices $26a$-$26e$ in FIG. 2, except that the data has had noise removed therefrom.

At time=2, the same noise-reduced data are stored in matrices $70a_2$-$70e_2$, and the process continues until time=N. Thus, the data sets in FIG. 9 can be seen to be in two categories, namely, simultaneous time (with different delays) and sequential time (with different delays). There are, therefore, data sets with various bright features, structures, which one wants to phase reference, and later data sets with the same type of data as to such features at later times.

The data sets for each simultaneous time are inverted with a fitting algorithm, as indicated at boxes $71_1$-$71_N$, and the phase differences are used to find the precise position and structural differences between the bright features for each data set time. The position information is encoded in the phase differences between features. The data for the relative positions of the bright features on the map at each time, as determined by phase differences, is stored, together with feature structure and brightness, in matrices $72_1$-$72_N$.

The next step in the process is to cross-correlate the sequentially adjacent data stored in matrices $72_1$-$72_N$ to identify stationary features. If the cross-correlation of time sequenced data is at a zero offset, then the feature has not moved and is stationary. The data for the unmoved features is partitioned from the rest of the data and stored in matrices $73_1$-$73_{N-1}$ to reduce computer processing time.

Those data from the cross-correlation which are not at a zero offset indicate motion of structure from one time to the next. Two types of motion typically can be found in the non-zero offset data, namely, motion that is real and to be studied, and equipment induced noise. The noise motion gives the image the appearance of having moved or being fuzzy. The entire aperture would appear to have been slightly displaced.

The motion of structure, by contrast, will be limited to objects within the frame. Accordingly, at upper half of the boxes designated "SPREAD/OFFSET" $73_1$-$73_{N-1}$, the spread offset function is found for all sequenced data sets relative to a defined reference data set. This spread/offset function defines the fuzziness or jitter and position inaccuracies from sequence to sequence.

Once the spread/offset is identified, the data is cross-correlated again to revise the data and remove the jitter. The data in boxes $75_1$-$75_N$, therefore, is the motion data corresponding to the data in matrices $72_1$-$72_N$, but revised to eliminate jitter.

The next step is to sequentially cross-correlate the jitter-free data in matrices $75_1$-$75_N$ to yield the data for motion of the structural features from time=1 to time=2, box $76_1$, and time=2 to time=3, box $76_2$, etc., until time=N-1 to time=N, box $76_{N-1}$. This motion then can be displayed directly on output device 78, filtered by filters $77_1$-$77_N$, or displayed with data as to the stationary objects as contained within matrices $73_1$-$73_{N-1}$ ("Stationary Features"). Filtering can be based on various criteria, for example, if the stationary data also is passed through for removal of jitter, it can then be filtered out by input from matrices $73_1$-$73_{N-1}$.

The process of FIG. 9 essentially takes noise-reduced sequential pictures of the maps, compares them, removes equipment noise, and then sequentially displays to show motion and structural changes.

While the present invention has been described with reference to a few specific embodiments, particularly relating to biomedical applications, the description is illustrative of the invention and is not to be construed as limiting the invention. Various modifications may occur to those skilled in the art without departing from the true spirit and scope of the invention as defined by the appended claims.

What is claimed is:

1. In a method of generating an echographic image of a target object including the steps of transmitting a plurality of ultrasonic signals toward said target object, receiving a corresponding plurality of echo signals from said target object, correlating said ultrasonic signals and said echo signals to produce correlated data including amplitude data sufficient to map an image of said target object and phase data, mapping said amplitude data, the improvement comprising the steps of:

partitioning said correlated data into a plurality of data sets including a visibility amplitude data set and a visibility phase data set;

reducing noise present in said correlated data by at least one of: (i) a side lobe subtraction process, (ii) a hybrid mapping process, (iii) a vectorial summing of possible combinations of three visibility phase data values to produce a closure phase data set, and (iv) forming ratios of possible combinations of four visibility amplitude data values to produce a closure amplitude data set; and during said mapping step, mapping said amplitude data and said phase data after said step of reducing noise.

2. The method as defined in claim 1 wherein, said reducing step is accomplished by a vectorial summing of all possible combinations of three visibility phase data values to produce a closure phase data set free of phase aberration, and during said mapping step, mapping said closure phase data set.

3. The method as defined in claim 2 wherein, said reducing step additionally includes the step of forming ratios of all possible combinations of four visibility amplitude data values to produce a closure amplitude data set, and during said mapping step, mapping said closure phase data set and said closure amplitude data set.

4. The method as defined in claim 3, and the step of:

prior to said mapping step, generating a differential phase data set, and during said mapping step, mapping said differential phase data.

5. The method as defined in claim 4, and after said steps of vectorial summing, forming ratios and generating, reducing noise by a side lobe subtraction process using said closure phase data set, said closure amplitude data set, said differential phase data set, said visibility amplitude data set and said visibility phase data set.

6. The method as defined in claim 4, and after said steps of vectorial summing, forming ratios and generating a differential phase data set, reducing noise by a hybrid mapping process using said visibility amplitude data set, said closure amplitude data set, said closure phase data set.

7. The method as defined in claim 6, and during said hybrid mapping process, using said visibility phase data set and said differential phase data set.

8. The method as defined in claim 2, and
after said vectorial summing step, reducing noise by a side lobe subtraction process using said closure phase data set.

9. The method as defined in claim 8, and the steps of:
during said reducing step, employing a side lobe subtraction process including the steps of:
  (i) mapping said visibility amplitude data set and visibility phase data set and said closure phase data set into a first map having noise in the time domain;
  (ii) identifying one bright data point on said first map;
  (iii) synthesizing a beam side lobe pattern from frequency data for said visibility amplitude data set, said visibility phase data set, and said closure phase data set;
  (iv) transforming said first map into the frequency domain;
  (v) subtracting said beam side lobe pattern from data around said bright data point in said first map in said frequency domain to produce noise-reduced frequency data;
  (vi) transforming said noise-reduced frequency data to time domain to produce a second map;
  (vii) identifying a second bright data point on said second map;
  (viii) transforming said second map into the frequency domain;
  (ix) subtracting said beam side lobe pattern from data around said bright data point in said second map in said frequency domain to produce further noise-reduced frequency data; and
  (x) transforming said further noise-reduced frequency data into the time domain.

10. The method as defined in claim 9, and the step of:
after said step of transforming said further noise-reduced data, displaying a time domain map.

11. The method as defined in claim 2, and
after said vectorial summing step, reducing noise by a hybrid mapping process using said closure phase data set.

12. The method as defined in claim 1 wherein,
said transmitting step is accomplished by transmitting ultrasonic signals from an array of ultrasonic transducers to enable synthesis of an aperture for imaging of said target object; and
said reducing step is accomplished by a side lobe subtraction process in which side lobe response inherent in said aperture synthesized from said array of ultrasonic transducers is subtracted from selected data in said data sets.

13. The method as defined in claim 12 wherein,
said side lobe subtraction process includes the steps of:
  (i) mapping the amplitude and phase data in said plurality of data sets into a dirty map in the time domain;
  (ii) identifying a bright point in said dirty map;
  (iii) generating a side lobe response pattern for said aperture in the frequency domain;
  (iv) transforming said dirty map into the frequency domain;
  (v) subtracting said side lobe response pattern from data points around the identified bright point in the frequency domain to produce cleaned frequency data;
  (vi) transforming said cleaned frequency data to a cleaned map in the time domain; and
after said side lobe subtraction process, displaying said cleaned map.

14. The method as defined in claim 13 and the steps of:
comparing said cleaned map to said dirty map for reduction of noise, and
iterating said side lobe subtraction process for other bright points in said dirty map.

15. The method as defined in claim 13 wherein,
said ultrasonic signals are transmitted in sets of a plurality of signals at a plurality of sequential time intervals;
each set of signals and corresponding set of echo signals is processed by said partitioning and reducing steps; and wherein,
said displaying step is accomplished by the steps of:
  (i) mapping all said data sets;
  (ii) identifying a plurality of bright features on each of said maps and storing feature data as to the position and brightness of each of said bright features;
  (iii) cross-correlating said feature data of each feature data set with said feature data of the sequentially next set of feature data;
  (iv) identifying changes in data between feature data sets to indicate motion;
  (v) revising data to remove jitter from each feature data set;
  (vi) cross-correlating the sequentially adjacent revised data sets to identify sequential motion; and
  (vii) sequentially displaying the revised cross-correlated data set.

16. The method as defined in claim 1 wherein,
said reducing step is accomplished by a hybrid mapping process in which model data for a given data point is substituted for actual data in the partitioned data sets.

17. The method as defined in claim 16 wherein,
said hybrid mapping process is accomplished by the steps of:
  (i) mapping amplitude data in the time domain to create a first amplitude map;
  (ii) identifying a bright data point in said first amplitude map;
  (iii) inverse transforming said bright data point into the frequency domain using a brightness distribution algorithm to generate model amplitude and phase data for said bright data point;
  (iv) substituting said model amplitude and phase data for corresponding actual amplitude and phase data in said partitioned data sets; and
thereafter mapping said partitioned data sets.

18. The method as defined in claim 17, and the step of:
  (i) after said substituting step, mapping a second amplitude map from the amplitude data sets;
  (ii) identifying a second bright data point in said second amplitude map different from said first bright data point;
  (iii) inverse transforming said second bright data point into the frequency domain using a brightness distribution algorithm to generate model amplitude and phase data for said second bright data point; and (iv) substituting said model amplitude and phase data for corresponding actual amplitude and phase data in said partitioned data sets.

19. The method as defined in claim 18, and the steps of:
during said partitioning step, generating data sets for visibility amplitude, visibility phase, during said reducing step, generating data sets for closure amplitude and closure phase.

20. The method as defined in claim 19 wherein,
said step of mapping amplitude data is accomplished by mapping visibility amplitude data and closure amplitude data.

21. The method as defined in claim 19 wherein,
during said partitioning step, generating a data set for differential phases.

22. The method as defined in claim 18, and the step of:
comparing model amplitude data to actual amplitude data by a goodness-of-fit comparison;
iterating the amplitude mapping, bright data point identification, inversion of the bright data point and substitution of model data steps until said comparing step produces a specified fit; and
mapping all data sets when said comparing step finds said amplitude data matches a specified fit.

23. The method as defined in claim 22, and the step of:
displaying the map of all data sets.

24. The method as defined in claim 23 wherein,
said ultrasonic signals are transmitted in sets of a plurality of signals at a plurality of sequential time intervals;
each set of signals and corresponding set of echo signals is processed by said partitioning and reducing steps; and wherein,
said displaying step is accomplished by the steps of:
(i) mapping all said data sets;
(ii) identifying a plurality of bright features on each of said maps and storing feature data as to the position and brightness of each of said bright features;
(iii) cross-correlating said feature data of each feature data set with said feature data of the sequentially next set of feature data;
(iv) identifying changes in data between feature data sets to indicate motion;
(v) revising data to remove jitter from each feature data set;
(vi) cross-correlating the sequentially adjacent revised data sets to identify sequential motion; and
(vii) sequentially displaying the revised cross-correlated data set.

25. The method as defined in claim 1, and the steps of:
said ultrasonic signals being transmitted in sets of a plurality of signals at a plurality of sequential time intervals;
each set of signals and corresponding set of echo signals being processed by said partitioning and reducing steps;
displaying the mapped amplitude data and phase data; and wherein,
said displaying step is accomplished by the steps of:
(i) mapping all said data steps;
(ii) identifying a plurality of bright features on each of said maps and storing feature data as to the position and brightness of each of said bright features;
(iii) cross-correlating said feature data of each feature data set with said feature data of the sequentially next set of feature data;
(iv) identifying changes in data between feature data sets to indicate motion;
(v) revising data to remove jitter from each feature data set;
(vi) cross-correlating the sequentially adjacent revised data sets to identify sequential motion; and
(vii) sequentially displaying the revised cross-correlated data set.

26. The method as defined in claim 25, and the step of:
separating unchanged data resulting from the first cross-correlating step.

27. The method as defined in claim 26, and the step of:
displaying said unchanged data.

28. The method as defined in claim 26, and the step of:
using said unchanged data to filter said remaining data.

29. The method as defined in claim 1 wherein,
said reducing step includes both said side lobe subtraction process and said hybrid mapping process.

30. The method as defined in claim 29 wherein,
said side lobe subtraction process is performed first and an output of said side lobe subtraction process is subsequently processed by said hybrid mapping process.

31. The method as defined in claim 30 wherein,
said ultrasonic signals are transmitted in sets of a plurality of signals at a plurality of sequential time intervals;
each set of signals and corresponding set of echo signals is processed by said partitioning step and by said side lobe subtraction process and said hybrid mapping process; and
the steps of:
(i) mapping all said data sets;
(ii) identifying a plurality of bright features on each of said maps and storing feature data as to the position and brightness of each of said bright features;
(iii) cross-correlating said feature data of each feature data set with said feature data of the sequentially next set of feature data;
(iv) identifying changes in data between feature data sets to indicate motion;
(v) revising data to remove jitter from each feature data set;
(vi) cross-correlating the sequentially adjacent revised data sets to identify sequential motion; and
(vii) sequentially displaying the revised cross-correlated data set.

32. In an apparatus for generating an echographic image including an ultrasonic transducer, generator means coupled to drive said transducer, signal processing means coupled to said transducer to receive echo signal data therefrom and coupled to receive transmitted ultrasonic signal data, said signal processing means correlating and mapping amplitude data from said ultrasonic signal data and said echo signal data, and display means coupled to said signal processing means to receive mapped data from said signal processing means and to display said mapped data as an image, the improvement comprising:
said apparatus including a plurality of ultrasonic transducers mounted in an array and coupled to said generator means and said signal processing means; and said signal processing means including means for processing phase data, said means for processing phase data including means for reducing noise in said phase data, said means for reducing noise being provided by one of: (i) means for subtracting side lobe noise from said phase data, and (ii) means for substituting hybrid map data for actual phase and amplitude data; and said processing means further mapping substantially all of said amplitude data and said phase data after the reduction of noise therefrom.

33. The apparatus as defined in claim 32 wherein, said signal process apparatus includes means for subtracting side lobe noise and means for substituting hybrid map data.

34. The apparatus as defined in claim 3 wherein, said means for subtracting hybrid data is positioned to receive an output from said means for subtracting side lobe noise.

35. The apparatus as defined in claim 32 wherein, said signal processing means includes means for processing a plurality of sequential sets of ultrasonic signals with each set being processed to reduce noise, and said signal processing means includes means to sequentially cross-correlate feature data from each set of signals and to sequentially display said cross-correlated feature data to show target object motion.

36. In an apparatus for generating an echographic image including a plurality of ultrasonic transducers mounted in an array, signal generator means coupled to drive said transducers, signal processing means coupled to receive echo signals from said transducers and coupled to receive echo signals, said signal processing means being response to correlate said echo signals relative to said transmitted signals to produce amplitude signals suitable for image mapping, and display means coupled to said signal processing means to receive said amplitude signals and response thereto to produce an image, the improvement in said apparatus comprising:

said signal processing means being responsive to said transmitted signals and said echo signals to correlate said echo signals relative to said transmitted signals to produce both amplitude signals and phase signals;

said signal processing means further including noise reduction means responsive to said phase signals and said amplitude signals to reduce noise in said phase signals and said amplitude signals;

said noise reduction means including at least one of: (i) means for subtracting side lobe noise from said amplitude signals and said phase signals, (ii) means for substituting hybrid map signals for said amplitude signals and said phase signals, (iii) means for vectorially summing sets of three phase signals to produce closure phase signals, and (iv) means for forming ratios of sets of four amplitude signals to produce closure amplitude signals;

said display means coupled to said signal processing means to receive signals therefrom at a position after noise reduction has been effected.

37. The apparatus as defined in claim 36 wherein, said noise reduction means includes means responsive to phase signals and said amplitude signals to communicate to said display means having reduced side lobe noise.

38. The apparatus as defined in claim 36 wherein, said noise reduction means includes means for subtracting side lobe noise from said amplitude and said phase signals.

39. The apparatus as defined in claim 36 wherein, said noise reduction means includes means for substituting hybrid map signals for said amplitude and said phase signals.

40. The apparatus as defined in claim 36 wherein, said noise reduction means includes means for forming ratios of sets of four amplitude signals to produce closure amplitude signals.

41. The apparatus as defined in claim 36 wherein, said noise reduction means includes means for vectorially summing sets of three phase signals to produce closure phase signals.

42. The apparatus as defined in claim 41 wherein, said signal processing means includes means for partitioning said amplitude signals, said phase signals and said closure phase signals into separate signal sets, and said signal processing means is formed for mapping of said image in response to said separate signal sets.

43. The apparatus as defined in claim 42 wherein, said noise reduction means also includes means for forming ratios of sets of four amplitude signals to produce closure amplitude signals, and said means for partitioning partitions said amplitude signals from the remaining signals.

44. The apparatus as defined in claim 43 wherein, said signal processing means is formed to respond to said phase signals to produce a set of differential phase signals, and said means for partitioning partitions said differential phase signals from the remaining signals.

45. The apparatus as defined in claim 44 wherein, said noise reduction means includes means for substituting hybrid map signals coupled to said partitioning means to receive signals therefrom and response thereto for substitution of hybrid mapping signals for signals in said separate signal sets.

46. The apparatus as defined in claim 44 wherein, said noise reduction means includes means for subtracting side lobe noise coupled to said partitioning means to receive signals therefrom and responsive thereto for reduction of side lobe noise from signals in said separate signal sets.

* * * * *

UNITED STATES PATENT AND TRADEMARK OFFICE
CERTIFICATE OF CORRECTION

PATENT NO. : 5,111,823

DATED : May 12, 1992

INVENTOR(S) : Nathan Cohen

It is certified that error appears in the above-identified patent and that said Letters Patent is hereby corrected as shown below:

Column 10, lines 62 and 63, delete the formula for $\tau'$ and insert therefor:

$$\tau'^2 = (D_{12}/C_s \cdot \cos\theta \cos\phi)^2 + (D_{12}/C_s \cdot \cos\theta \sin\phi)^2$$

Column 12, line 52, after "data," delete the formula and insert therefor: $\phi_{ij}^{\omega}$ Column 12, line 57, after "data," delete the formula and insert therefor: $\phi_{ij}^{\Delta\omega}$ Column 25, line 16, Claim 34, line 1, delete "3" and insert ---33---.

Signed and Sealed this

Twentieth Day of July, 1993

Attest:

MICHAEL K. KIRK

*Attesting Officer*   Acting Commissioner of Patents and Trademarks